US007020724B2

United States Patent
Emerson et al.

(10) Patent No.: US 7,020,724 B2
(45) Date of Patent: Mar. 28, 2006

(54) ENHANCED POWER REDUCTION CAPABILITIES FOR STREAMING DIRECT MEMORY ACCESS ENGINE

(75) Inventors: David Emerson, San Jose, CA (US); Seh Kwa, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 09/968,473

(22) Filed: Sep. 28, 2001

(65) Prior Publication Data
US 2003/0065832 A1 Apr. 3, 2003

(51) Int. Cl.
*G06F 13/28* (2006.01)

(52) U.S. Cl. .............................. 710/22; 710/23; 710/72; 714/56; 713/300

(58) Field of Classification Search .................. 710/22, 710/23, 72; 714/56; 713/300
See application file for complete search history.

(56) References Cited

U.S. PATENT DOCUMENTS

| 5,708,779 | A | * | 1/1998 | Graziano et al. ........... 709/250 |
| 5,761,537 | A | * | 6/1998 | Sturges et al. ................ 710/72 |
| 6,192,492 | B1 | * | 2/2001 | Masiewicz et al. ........... 714/56 |
| 6,275,877 | B1 | * | 8/2001 | Duda ........................... 710/23 |
| 6,449,666 | B1 | * | 9/2002 | Noeldner et al. .............. 710/23 |
| 6,470,238 | B1 | * | 10/2002 | Nizar et al. ................... 700/299 |
| 6,567,953 | B1 | * | 5/2003 | Pomerantz ................... 714/805 |
| 6,798,418 | B1 | * | 9/2004 | Sartori et al. ................ 345/519 |
| 2001/0018719 | A1 | * | 8/2001 | Francis ......................... 710/22 |
| 2002/0078269 | A1 | * | 6/2002 | Agarwala et al. .............. 710/22 |
| 2002/0166004 | A1 | * | 11/2002 | Kim ............................ 710/22 |

OTHER PUBLICATIONS

Tanenbaum, Andrew, Structured Computer Organization, 1990, Prentice-Hall, Inc., 3rd Ed., pp. 11-13.*

* cited by examiner

*Primary Examiner*—Kim Huynh
*Assistant Examiner*—Justin Knapp
(74) *Attorney, Agent, or Firm*—Blakely, Sokoloff, Taylor & Zafman LLP

(57) ABSTRACT

A streaming direct memory access (DMA) engine is disclosed. The streaming DMA engine includes several power reduction capabilities. A controller throttles the DMA engine according to the system throughput requirement and the system processor operation state. The DMA engine holds off a new read request to the memory if the data present in the DMA engine requires re-transmission. The DMA engine holds off a new write request to the memory if the data present in the DMA engine is corrupted, until the corrupted data is discarded.

15 Claims, 5 Drawing Sheets

ENHANCED POWER REDUCTION CAPABILITIES FOR STREAMING DIRECT MEMORY ACCESS ENGINE

FIELD OF THE INVENTION

The present invention relates to computer memory systems. Specifically, this invention relates to providing enhanced power reduction capabilities for streaming Direct Memory Access (DMA) engines.

BACKGROUND OF THE INVENTION

Direct Memory Access/addressing (DMA) is a method of transferring data from one memory area to another without having to go through the central processing unit. Computers with DMA channels can transfer data to and from devices much more quickly than those in which the data path goes through the computer's main processor. The DMA channels are controlled by DMA engines. The conventional DMA engines typically act as passive data communicators. The conventional DMA engine designs focus on achieving the maximum throughput, minimizing latency, or enhancing flexibility in assigning sources and destinations. For example, the conventional DMA engines provide for constant data transfer rates regardless of the variations in the system throughput requirement or the system power state.

BRIEF DESCRIPTION OF THE DRAWINGS

The present invention is illustrated by way of example and not limitation in the figures of the accompanying drawings in which.

DETAILED DESCRIPTION

Figure 1:
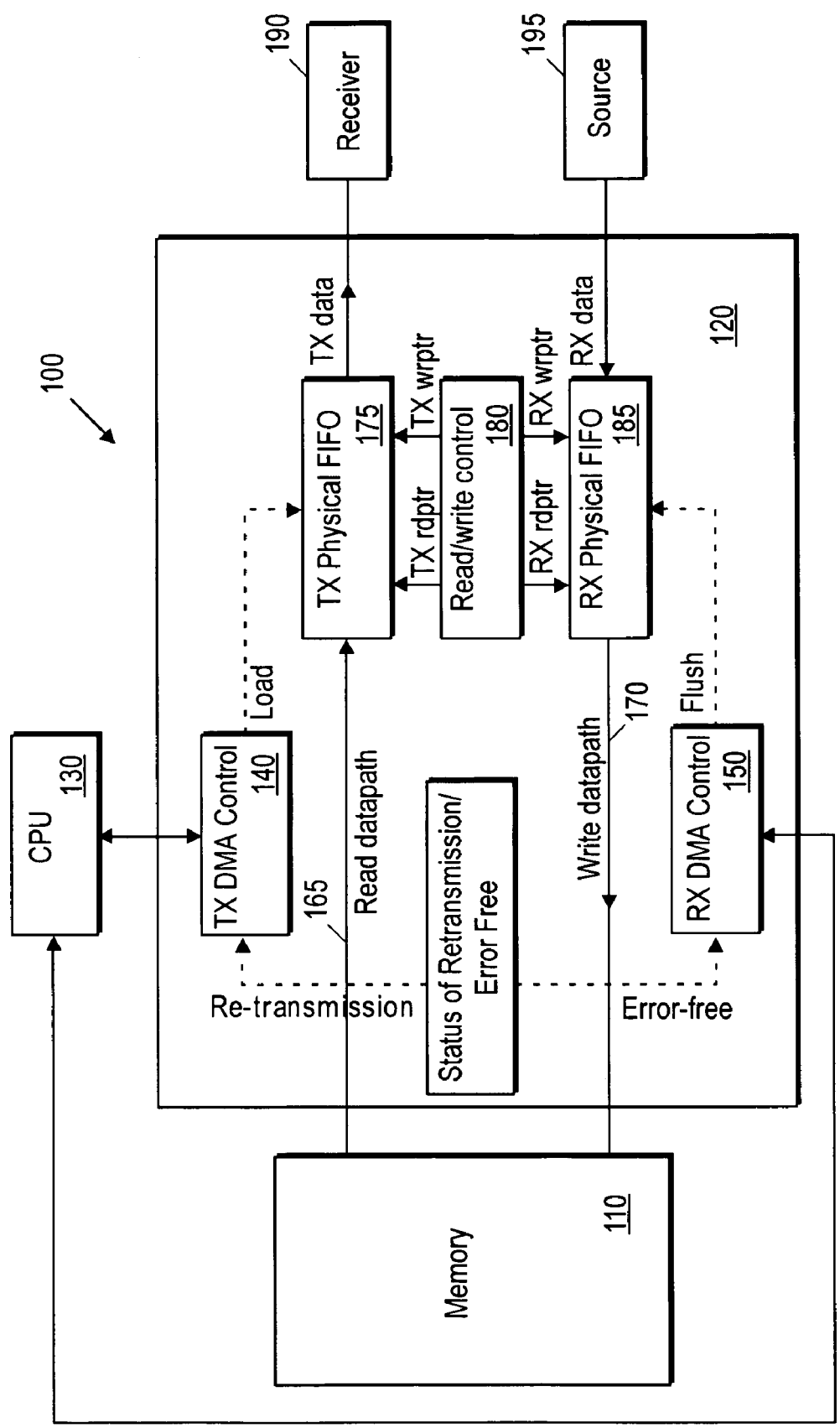
FIG. 1 illustrates one embodiment of the block diagram of the computing system including the streaming DMA engine.

A computer system and a method to provide enhanced power reduction capabilities for a streaming Direct Memory Access (DMA) engine are described. The streaming DMA engine includes a controller to provide it with the flexibility to utilize power reduction capabilities. The power reduction capabilities include the capability to throttle the DMA engine and the capability to avoid unnecessary data transfer activities on the DMA channel. The power reduction capabilities can reduce the system power dissipation.

In this description, the DMA channel is also referred to as the datapath. The DMA channel couples two different memory locations. The DMA channel can include a component of a shared bus architecture. The memory location can include a Random Access Memory (RAM) a Read Only Memory (ROM), a memory subsystem, a disk storage subsystem of a computer system, and flash memory, and the like. In this description, throttling refers to controlling the rate of data transfer through the DMA channel.

In one aspect of the present invention, the controller includes the capability to throttle the streaming DMA engine according to the variations in the system throughput requirements. In another aspect of the present invention, the controller includes the capability to throttle the streaming DMA engine according to the variations in the system power states. In yet another aspect of the present invention, the controller includes the capability to hold off a new read request to the memory if the data present in the streaming DMA engine requires re-transmission. In still another aspect of the present invention, the controller includes the capability to perform a data integrity check to detect corrupted data. The controller also has the capability to hold off a new write request to the memory if the data present in the streaming DMA engine is corrupted, until the corrupted data is discarded.

The streaming DMA engine of the present invention is focused on maintaining sustainable system throughput requirements and saving power. The streaming DMA engine presents an opportunity for power saving because the controller can throttle the streaming DMA engine according to the system throughput requirement and the system power state, and because the controller can hold off data transfers by the DMA engine.

In one embodiment, the functional blocks of the streaming DMA engine include a transmit control module, a receive control module, a transmit first in first out (FIFO) memory buffer, a receive first in first out (FIFO) memory buffer, and a read/write control module.

The combination of the transmit control module and the receive control module is referred to as the controller. The transmit and receive control modules can include programmable modules. The transmit control module can be coupled to the system central processing unit (CPU) and the transmit FIFO memory buffer. The receive control module can be coupled to the system CPU and the receive FIFO memory buffer.

The transmit FIFO memory buffer can include the data fetched from the memory. The transmit control module is configured to generate a read request to the memory to fetch data into the transmit FIFO memory buffer. The transmit control module is configured to hold off from generating a new read request to the memory if the data present in the transmit FIFO memory buffer is requiring re-transmission. Data re-transmission can be required due to various reasons, such as because corrupt data is detected by the target or because the target lacks a resource to handle the transmission. The transmit control module can be configured to hold off from generating a new read request to the memory until the data present in the transmit FIFO memory buffer is transmitted.

The receive FIFO memory buffer can include the data to be stored in the memory. The receive control module is configured to generate a write request to the memory to store the data present in the receive FIFO memory buffer. The receive control module is configured to hold off from generating the write request to the memory if the data present in the receive FIFO memory buffer is found to be corrupted or incomplete. In the ensuing description, the terms corrupted and incomplete are used interchangeably. Incomplete data can result from malformed data format, because the quantity of received data does not match the required data length, or because the attributes such as traffic type and address associated with the data cannot be decoded. The receive control module is configured to hold off from generating the write request to the memory until the corrupted data is discarded.

The transmit and receive control modules are configured to monitor the system CPU traffic demand and the system CPU operating state. The transmit and receive control modules adjust the rate of the generation of read and write requests, respectively, according to the system CPU traffic demand and the system CPU operating state.

FIG. 1 illustrates an exemplary block diagram of the computing system including the streaming DMA engine. The computing system 100 is shown including the streaming DMA engine 120 coupled to the memory 110, the system central processing unit (CPU) 130, the receiver 190 and the source 195. The functional blocks of the streaming DMA engine 120 include the transmit control module 140, the receive control module 150, the transmit FIFO memory buffer 175, the receive FIFO memory buffer 185, and the read/write control module 180.

In one embodiment, the transmit control module 140 includes software logic embedded inside the transmit FIFO memory buffer 175. The software logic is implemented through a programming language selected from the group consisting of C, C++, Java and Visual Basic. In another embodiment, the transmit control module 140 includes hardware logic embedded inside the transmit FIFO memory buffer 175. In still another embodiment, the transmit control module 140 includes firmware logic embedded inside the transmit FIFO memory buffer 175. The firmware logic is implemented by recording program instructions on a hardware selected from the group consisting of Read Only Memory (ROM), Programmable Read Only Memory (PROM) and Erasable Programmable Read Only Memory (EPROM). The transmit control module 140 can be a programmable module.

In one embodiment, the receive control module 150 includes software logic embedded inside the receive FIFO memory buffer 185. The software logic is implemented through a programming language selected from the group consisting of C, C++, Java and Visual Basic. In another embodiment, the receive control module 150 includes hardware logic embedded inside the receive FIFO memory buffer 185. In still another embodiment, the receive control module 150 includes firmware logic embedded inside the receive FIFO memory buffer 185. The firmware logic is implemented by recording program instructions on a hardware selected from the group consisting of Read Only Memory (ROM), Programmable Read Only Memory (PROM) and Erasable Programmable Read Only Memory (EPROM). The receive control module 150 can be a programmable module.

The transmit FIFO memory buffer 175 can include physical memory such as the random access memory (RAM). The transmit FIFO memory buffer 175 can be referred to as the transmit physical FIFO. The receive FIFO memory buffer 185 can also include the physical memory such as the random access memory (RAM). The receive FIFO memory buffer 175 can be referred to as the receive physical FIFO.

The transmit physical FIFO 175 is coupled to the memory 110 and the receiver 190. The receiver 190 can include a memory location. The receiver 190 is configured to receive data from the transmit physical FIFO 175. The receive physical FIFO 185 is coupled to the memory 110 and the source 195. The source 195 can include a memory location. The source 195 is configured to send data to the receive physical FIFO 185.

Figure 2:
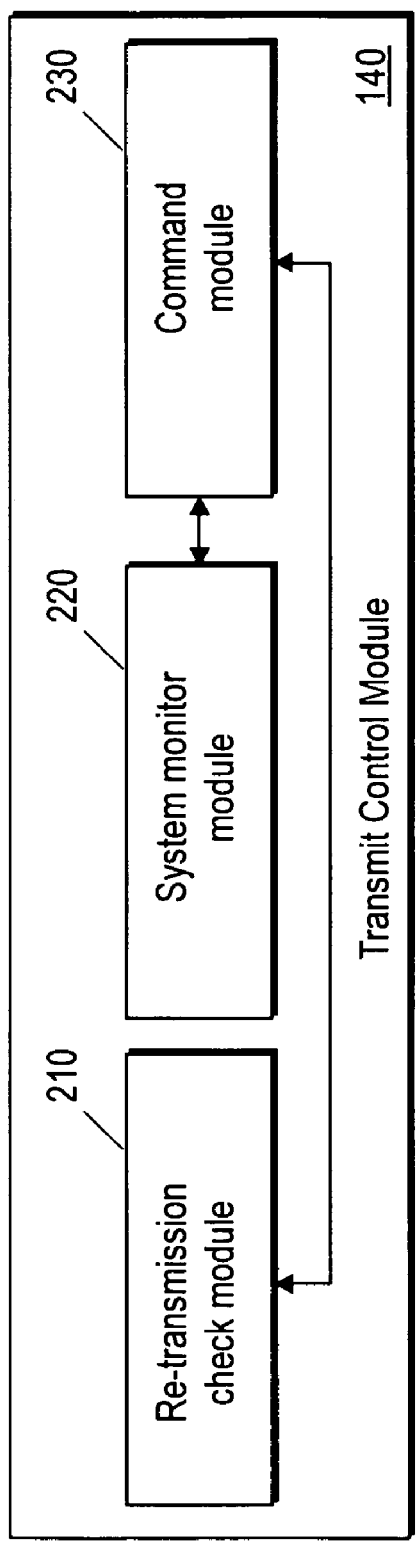
FIG. 2 illustrates one embodiment of the block diagram of the transmit control module.

FIG. 2 illustrates an exemplary block diagram of the transmit control module. The transmit control module 140 is shown including the command module 230 coupled to the re-transmission check module 210 and the system monitor module 220. The retransmission check module 210 is configured to determine if the data present in the transmit physical FIFO 175 requires re-transmission. The command module 230 is configured to instruct the read/write control module 180 to hold off from generating a new read request to the memory 110 if the re-transmission check module 210 determines that the data present in the transmit physical FIFO 175 requires re-transmission.

The system monitor module 220 monitors the system CPU 130 data traffic and the system CPU 130 operation state. The command module 230 throttles the transmit physical FIFO 175 according to the system CPU 130 data traffic and the system CPU 130 operation state. In other words, the command module 230 determines the rate of read requests generation by the read/write control module 180 according to the system CPU 130 data traffic and the system CPU 130 operation state. For example, the command module 230 can instruct the read/write control module 180 to generate the read requests at a high rate during the period of system CPU 130 high data traffic and active operation state. For another example, the command module 230 can instruct the read/write control module 180 to generate the read requests at a low or medium rate during the period of system CPU 130 idle operation states. In one embodiment, the command module 230 can use a control bit to instruct the read/write control module 180 to hold off the generation of a new read request. In another embodiment, the command module 230 can use a control bus to instruct the read/write control module 180 to hold off the generation of a new read request. The read request can include the starting address and the transfer length for the data to be fetched from the memory 110 into the transmit physical FIFO 175.

Figure 3:
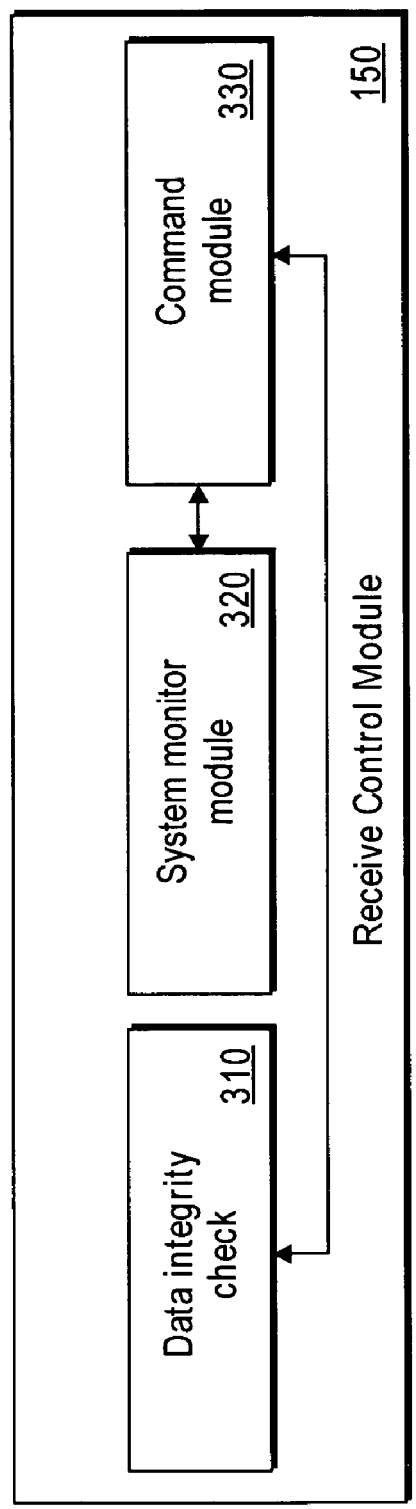
FIG. 3 illustrates one embodiment of the block diagram of the receive control module.

FIG. 3 illustrates an exemplary block diagram of the receive control module. The receive control module 150 is shown including the command module 330 coupled to the data integrity check module 310 and the system monitor module 320. The data integrity check module 310 is configured to determine if the data present in the receive physical FIFO 185 is corrupted or incomplete. The data integrity check module 310 can determine whether the data is error-free or corrupted by snooping on the data packet header, by performing a cyclic redundancy check (CRC) on the data, or by using other data integrity check techniques. The command module 330 is configured to instruct the read/write control module 180 to hold off from generating a new write request to the memory 110 if the data integrity check module 310 determines that the data present in the receive physical FIFO 185 is corrupted. The command module 180 is configured to instruct the read/write control module 180 to generate a new write request after the corrupted data is discarded.

The system monitor module 320 monitors the system CPU 130 data traffic and the system CPU 130 operation state. The command module 330 throttles the receive physical FIFO 185 according to the system CPU 130 data traffic and the system CPU 130 operation state. In other words, the command module 330 determines the rate of write requests generation by the read/write control module 180 according to the system CPU 130 data traffic and the system CPU 130 operation state. For example, the command module 330 can instruct the read/write control module 180 to generate the write requests at a high rate during the period of system CPU 130 high data traffic and active operation state. For another example, the command module 330 can instruct the read/write control module 180 to generate the read requests at a low or medium rate during the period of system CPU 130 idle operation states. In one embodiment, the command module 330 can use a control bit to instruct the read/write control module to hold off the generation of a new write request. In another embodiment, the command module 330 can use a control bus to instruct the read/write control module 180 to hold off the generation of a new write request. The write request can include the starting address for the pre-allocated memory 110 section.

Figure 4:
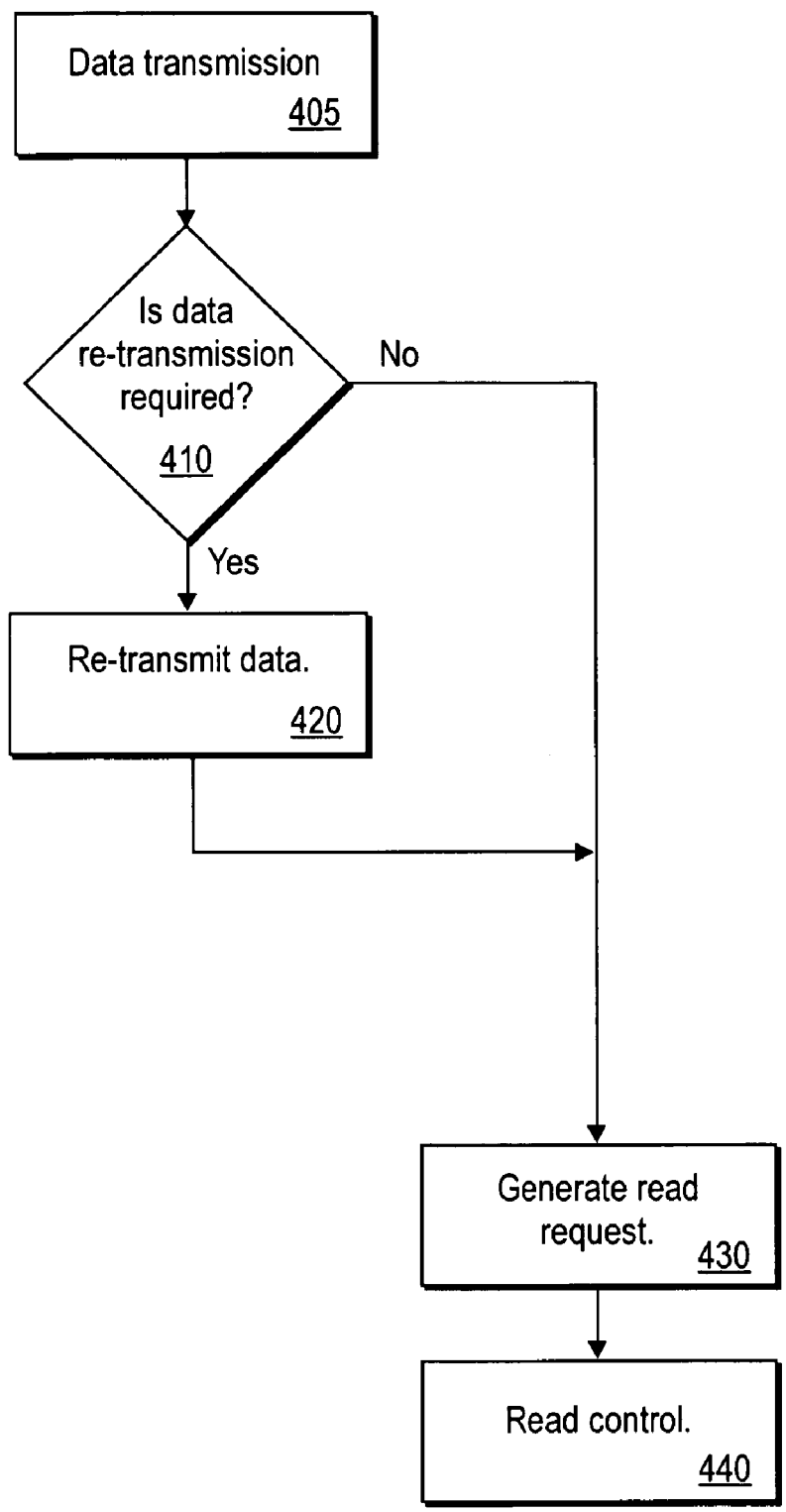
FIG. 4 illustrates one embodiment of the flow diagram of the method to enable power reduction in the streaming DMA engine.

FIG. 4 illustrates an exemplary flow diagram of a method to enable power reduction in a streaming DMA engine. The DMA engine receives data at block 405. A determination whether data re-transmission is required is made at block 410. If the data re-transmission is not required, then a new read request to the memory at block 430 is generated. In one embodiment, if the data re-transmission is required, then the data is re-transmitted at block 420 before a new read request to the memory is generated at block 430. It will be appreciated that in an alternate embodiment, the new request to the memory is generated at block 430 without first re-transmitting the data at block 420. The data is re-transmitted at a later time. Holding off the new read request generation until the data is re-transmitted results in a power saving. The DMA engine receives new data responsive to the new read request at block 440.

Figure 5:
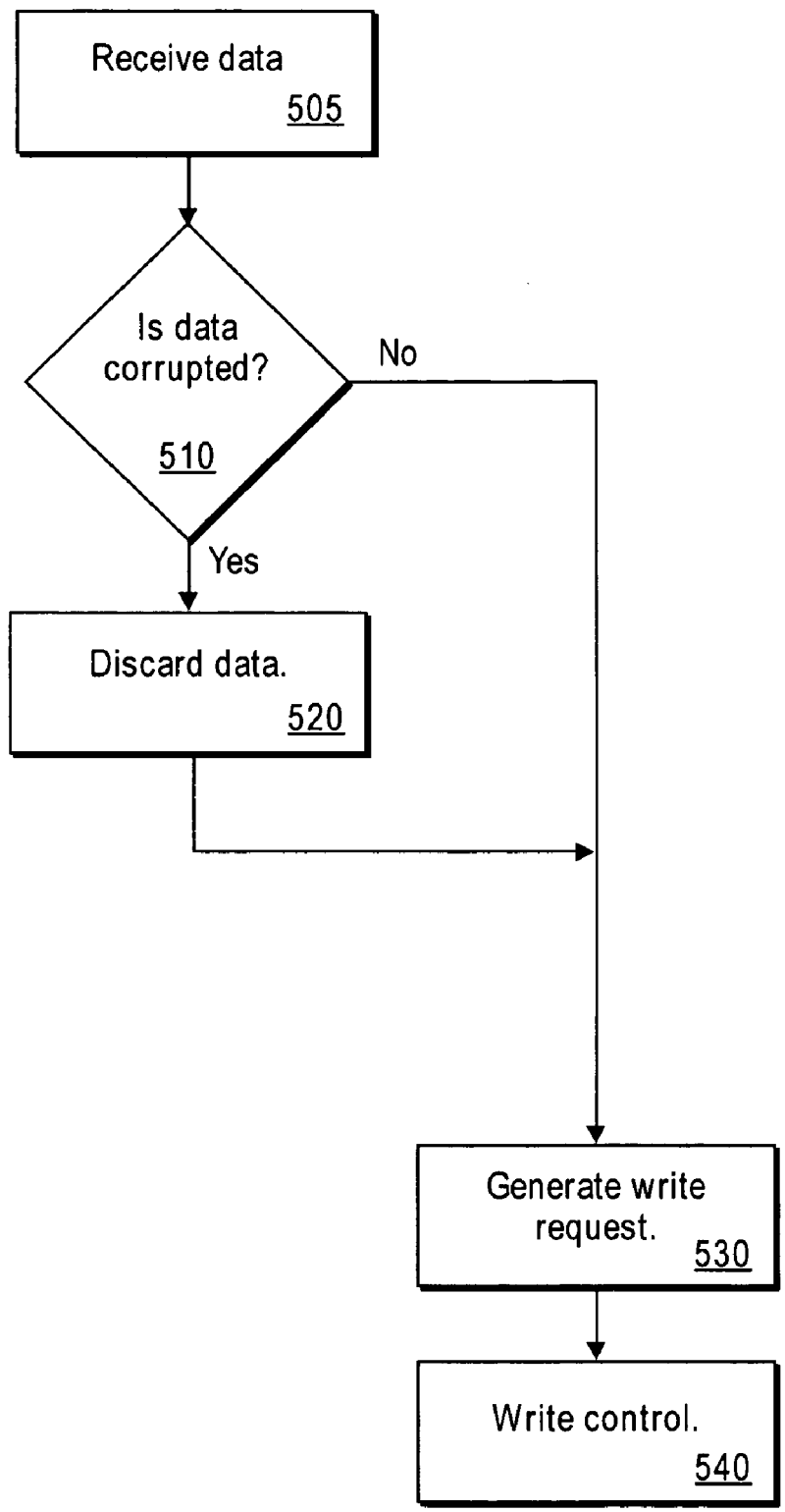
FIG. 5 illustrates another embodiment of the flow diagram of the method to enable power reduction in the streaming DMA engine.

FIG. 5 illustrates another exemplary flowchart of a method to enable power reduction in a streaming DMA engine. The DMA engine receives data at block 505. A determination whether data is corrupted is made at block 510. If the data is not corrupted, then a new write request to the memory is generated at block 530. If the data is corrupted, then the data is discarded at block 520 before a new write request to the memory is generated at block 530. It will be appreciated that in an alternate embodiment, the new write request to the memory is generated at block 530 without first discarding the data at block 520. The data is discarded at a later time. Holding off the new write request generation until the data is discarded results in a power saving. The DMA engine transmits new data responsive to the new write request at block 540.

These and other embodiments of the present invention may be realized in accordance with these teachings, and it should be evident that various modifications and changes can be made in these teachings without departing from the broader spirit and scope of the invention. The specification and drawings, accordingly, should be regarding in an illustrative rather than a restrictive sense and the invention measured only in terms of the claims.

In addition, the methods as described above can be stored in memory of a computer system as a set of instructions to be executed. In addition, the instructions to perform the methods as described above could alternatively be stored on other forms of computer readable mediums including magnetic and optical disks. A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other forms of propagated signals (e.g., carrier waves, infrared signals, digital signals, etc.); etc.

What is claimed is:

1. A computing system comprising;
a direct memory access engine having a controller comprising a transmit control module and a receive control module; and
a memory coupled to the controller, the transmit control module to delay generating a new read request to the memory and the receive control module to delay generating a new write request to the memory to throttle the direct memory access engine to provide power reduction.

2. The computing system of claim 1, wherein the controller re-transmits a datum received from the memory requiring a re-transmission before generating the new read request to the memory.

3. The computing system of claim 1, wherein the controller discards a corrupted datum before generating the new write request to the memory.

4. The computing system of claim 1, wherein the controller throttles the direct memory access engine according to a computing system throughput requirement.

5. The computing system of claim 1, wherein the controller throttles the direct memory access engine according to a computing system central processing unit operation state.

6. The computing system of claim 1, wherein the controller is implemented in software through a programming language selected from the group consisting of C, C++, Java and Visual Basic.

7. The computing system of claim 1, wherein the controller is implemented in firmware by recording program instructions on a hardware selected from the group consisting of read only memory (ROM), programmable read only memory (PROM) and erasable programmable read only memory (EPROM).

8. A method for a computing system comprising:
determining a computing system throughput requirement; and
throttling a direct memory access engine to vary a rate of read requests by a controller comprising a transmit control module and a receive control module, the transmit control module to delay generating a new read request to the memory and the receive control module to delay generating a new write request to the memory in accordance with the system throughput requirement to provide power reduction.

9. The method of claim 8, further including re-transmitting a datum received from a memory requiring a re-transmission before generating the new read request to the memory.

10. The method of claim 8, further including discarding a corrupted datum before generating the new write request to the memory.

11. The method of claim 8, further including throttling the direct memory access engine according to a computing system central processing unit operation state.

12. A computer-readable medium providing instructions, which if executed by a processor, causes the processor to perform a method for a computing system comprising:
determining a computing system throughput requirement; and
throttling a direct memory access engine to vary a rate of read requests by a controller comprising a transmit control module and a receive control module, the transmit control module to delay generating a new read request to the memory and the receive control module to delay generating a new write request to the memory in accordance with the system throughput requirement to provide power reduction.

13. The medium of claim 12, further including the controller re-transmitting a datum received from a memory requiring a re-transmission before generating a the new read request to the memory.

14. The medium of claim 12, further including the controller discarding a corrupted datum before generating the new write request to the memory.

15. The medium of claim 12, further including the controller throttling the direct memory access engine according to a computing system central processing unit operation state.

* * * * *

UNITED STATES PATENT AND TRADEMARK OFFICE
CERTIFICATE OF CORRECTION

PATENT NO. : 7,020,724 B2 Page 1 of 1
APPLICATION NO. : 09/968473
DATED : March 28, 2006
INVENTOR(S) : Emerson et al.

It is certified that error appears in the above-identified patent and that said Letters Patent is hereby corrected as shown below:

In column 6, at line 56, at the second occurrence, delete "a".

Signed and Sealed this

Thirteenth Day of March, 2007

JON W. DUDAS
*Director of the United States Patent and Trademark Office*